L. J. TORGERSON.
LATHE ATTACHMENT.
APPLICATION FILED AUG. 9, 1915.

1,178,277.

Patented Apr. 4, 1916.
2 SHEETS—SHEET 1.

WITNESSES
M. R. McI~~~
G. E. Sorensen

INVENTOR
LEWIS J. TORGERSON
BY Paul & Paul
ATTORNEYS

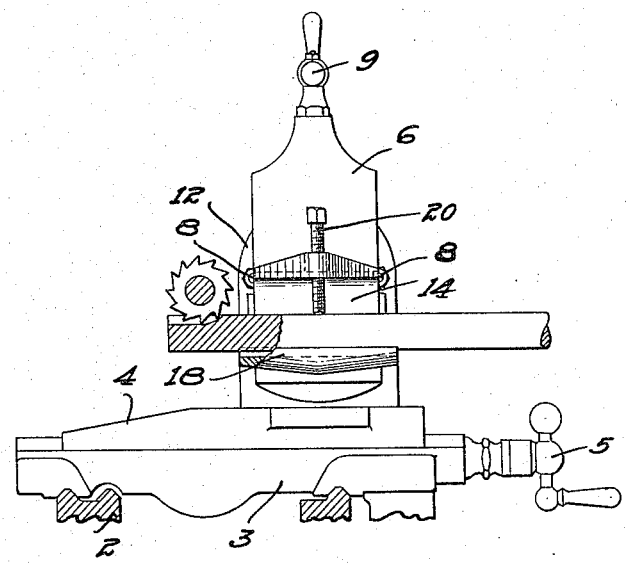
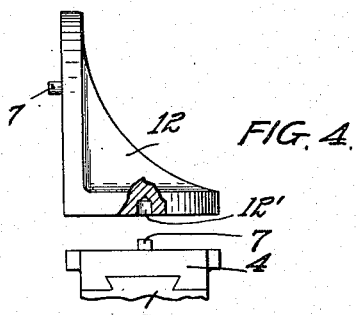
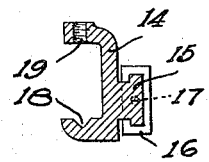
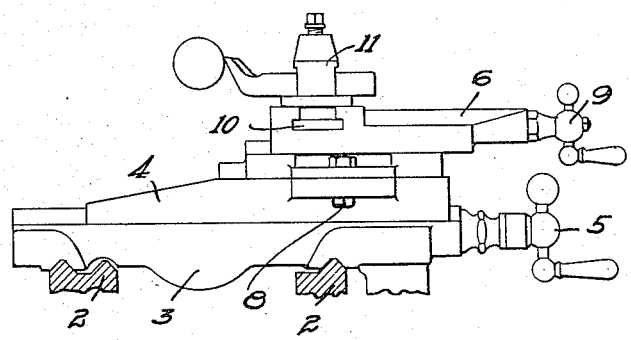
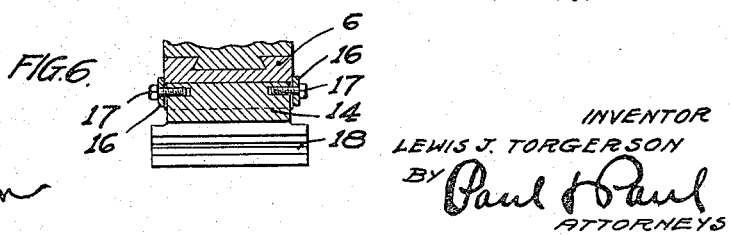

UNITED STATES PATENT OFFICE.

LEWIS J. TORGERSON, OF ELLENDALE, MINNESOTA.

LATHE ATTACHMENT.

1,178,277. Specification of Letters Patent. Patented Apr. 4, 1916.

Application filed August 9, 1915. Serial No. 44,639.

*To all whom it may concern:*

Be it known that I, LEWIS J. TORGERSON, citizen of the United States, resident of Ellendale, county of Steele, State of Minnesota, have invented certain new and useful Improvements in Lathe Attachments, of which the following is a specification.

In the operation of a lathe, it is customary to provide various attachments for doing different kinds of work. For instance, a tool holder attachment will be mounted on the lathe if the operator desires to turn a shaft or operate a facing or finishing tool, but should it be desired to cut a key-seat or perform a milling operation where the feed of the work is transversely of the carriage, it is necessary to provide a separate attachment to substitute in place of the tool holder. These different attachments add very considerably to the cost of the lathe and the object of my invention is to provide means for mounting an attachment on a carriage which will adapt it both for use in a horizontal position as a tool-holder and in a vertical position as a work-holder.

The invention consists generally in a lathe attachment as hereinafter described and particularly pointed out in the claims.

Figure 1:
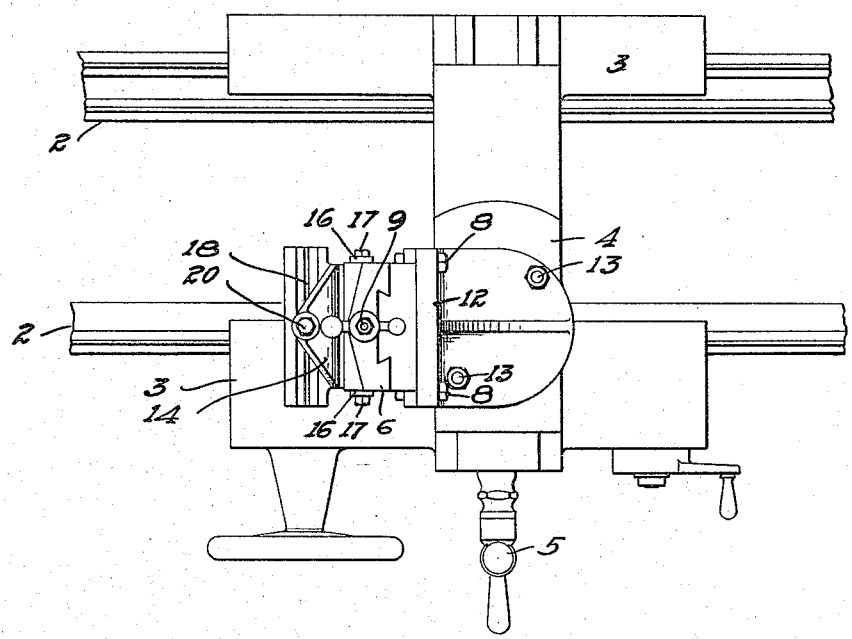
Figure 2:
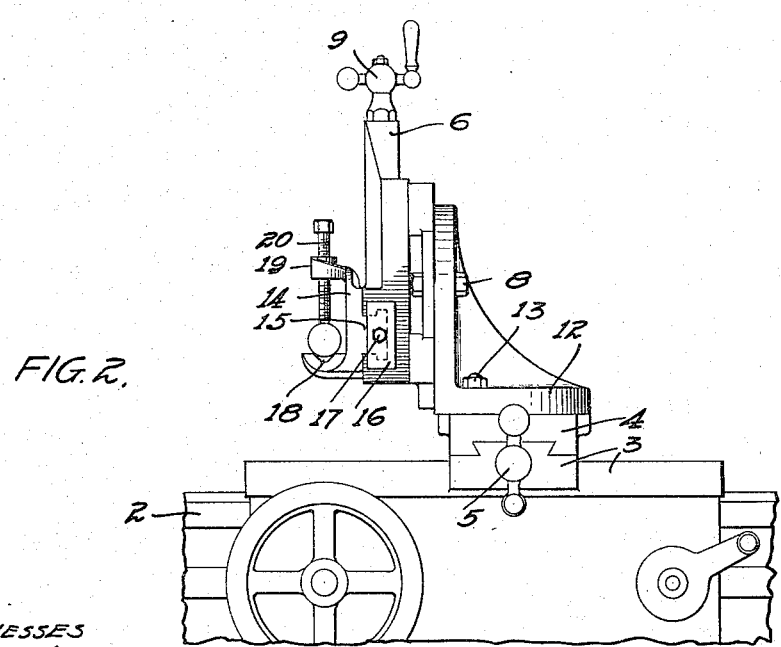

In the accompanying drawings forming part of this specification, Figure 1 is a plan view of a portion of a lathe bed and carriage, with my invention applied thereto, Fig. 2 is a side elevation of the same, Fig. 3 is a transverse sectional view through the lathe bed, showing an elevation of my invention, Fig. 4 is a detail sectional view of the bracket device which I utilize for mounting the lathe attachment in a vertical position, Fig. 5 is a detail sectional view, showing the work-holding device that is mounted in the attachment when used in a vertical position, Fig. 6 is a detail sectional view, showing the means for holding this work-supporting device in place on the attachment, Fig. 7 is a view, illustrating the attachment when used in a horizontal position on the lathe bed.

In the drawing, 2 represents a portion of the bed of a lathe.

3 is a carriage mounted on said bed in the usual way and 4 is a base, movable transversely of the bed by means of the usual operating device 5, all these parts being common to lathes in general use.

6 represents a lathe attachment, furnished with the lathe, to be used in a horizontal position, as indicated in Fig. 7, and adapted for supporting a tool.

A pin 7 is mounted in the base 4 and adapted to enter a socket in the attachment 6 and bolts 8 are provided in holes in said attachment for securing it to the base 4. In the trade this attachment is known as a "compound rest." It is provided with the usual feed device 9 and with a T-shaped slot 10 in which the tool holder 11, of ordinary construction, is mounted.

Assuming now that it is desired to mill a piece of work or form a key-seat in a shaft mounted transversely of the lathe, it will be necessary to remove this attachment and substitute one in a vertical position. To avoid the necessity of doing this, I provide a bracket 12 having a socket 12′ to receive the pin 7 and provided with holes through which bolts 13 are inserted for securing the bracket to the base 4, the bracket being substituted in place of the attachment 6. The upright portion of the bracket has a flat face against which the attachment 6 is seated and secured by the same bolts that were used for securing this attachment in a horizontal position on the base 4. The tool carrier is removed from the T-shaped socket 10 and in place thereof a holder 14 having a T-shaped tongue 15 is provided, said tongue being inserted into the socket 10 and secured therein by means of plates 16 and screws 17, which are tapped into the tongue. This holder has a seat 18 for the work and a socket 19 to receive a clamping screw 20. The work holder is raised and lowered by the operation of the adjusting device 9 in the same manner as the tool holder would be when the attachment is used in a horizontal position. By the simple addition of the bracket 12 and the work-holder 14, I am able to adapt a single attachment for both horizontal and vertical use and thereby dispense with the necessity of providing a separate attachment for each kind of work.

In various ways the details of construction herein shown and described may be modified and still be within the scope of my invention.

I claim as my invention:

1. The combination, with a lathe carriage having a seat whereon a lathe attachment may be mounted when used as a tool holder, of a member having a face to fit said seat and be secured thereon, when said attachment is removed, and having a second face whereto said lathe attachment may be secured when used as a work support.

2. The combination, with a lathe carriage having a seat whereon a lathe attachment may be mounted horizontally for use as a tool holder, of a bracket having faces at right angles substantially to one another, one of said faces having means for securing it to said seat when the lathe attachment is removed, and the other face having means for supporting the lathe attachment in a vertical position for use as a work support.

In witness whereof, I have hereunto set my hand this 25 day of June, 1915.

LEWIS J. TORGERSON.

Witnesses:
W. E. GALLOWAY,
W. E. STEELE.

Copies of this patent may be obtained for five cents each, by addressing the "Commissioner of Patents, Washington, D. C."